(12) United States Patent
Stojanovski et al.

(10) Patent No.: US 11,394,454 B2
(45) Date of Patent: *Jul. 19, 2022

(54) LAWFUL INTERCEPT REPORTING IN WIRELESS NETWORKS USING PUBLIC SAFETY RELAYS

(71) Applicant: Apple Inc., Cupertino, CA (US)

(72) Inventors: Alexandre Stojanovski, Paris (FR); Muthaiah Venkatachalam, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/001,051

(22) Filed: Aug. 24, 2020

(65) Prior Publication Data

US 2021/0050907 A1 Feb. 18, 2021

Related U.S. Application Data

(63) Continuation of application No. 14/671,728, filed on Mar. 27, 2015, now Pat. No. 10,756,804.

(Continued)

(51) Int. Cl.
*H04W 8/00* (2009.01)
*H04B 7/155* (2006.01)
(Continued)

(52) U.S. Cl.
CPC .......... *H04B 7/155* (2013.01); *H04B 7/15507* (2013.01); *H04L 63/306* (2013.01); *H04W 12/02* (2013.01); *H04W 12/033* (2021.01); *H04W 12/037* (2021.01); *H04W 12/06* (2013.01); *H04W 12/069* (2021.01);
(Continued)

(58) Field of Classification Search
None
See application file for complete search history.

(56) References Cited

U.S. PATENT DOCUMENTS 7,730,521 B1 * 6/2010 Thesayi ............... H04L 63/306
726/4
2001/0052081 A1 12/2001 McKibben et al.
(Continued)

FOREIGN PATENT DOCUMENTS

| CN | 103634812 A | 3/2014 |
| WO | 2014/020125 A1 | 2/2014 |
| WO | 2015141165 A | 9/2015 |

OTHER PUBLICATIONS

Notice of Allowance dated Jun. 24, 2020 for Korean Patent Application No. 10-2018-7007378.
(Continued)

*Primary Examiner* — Brandon M Renner
(74) *Attorney, Agent, or Firm* — Eschweiler & Potashnik, LLC

(57) ABSTRACT

A relay device assists in enabling lawful intercept (LI) by reporting, to a LI entity associated with the cellular network, authenticated identities of remote UEs (such as remote UEs connected via proximity services) and identification information that may allow the LI entity to monitor traffic (and/or control statistics related to the traffic) associated with the remote UEs. The authentication of the remote UEs may be performed using a technique that does not require involvement of the cellular network.

24 Claims, 8 Drawing Sheets

Related U.S. Application Data

(60) Provisional application No. 61/990,608, filed on May 8, 2014.

(51) Int. Cl.

| | | |
|---|---|---|
| *H04W 88/04* | (2009.01) | |
| *H04L 9/40* | (2022.01) | |
| *H04W 12/02* | (2009.01) | |
| *H04W 12/06* | (2021.01) | |
| *H04W 12/033* | (2021.01) | |
| *H04W 12/037* | (2021.01) | |
| *H04W 12/069* | (2021.01) | |
| *H04W 12/80* | (2021.01) | |
| *H04W 88/18* | (2009.01) | |
| *H04W 80/04* | (2009.01) | |
| *H04W 76/14* | (2018.01) | |
| *H04L 9/30* | (2006.01) | |
| *H04L 9/32* | (2006.01) | |

(52) U.S. Cl.
CPC ............ *H04W 12/80* (2021.01); *H04W 88/04* (2013.01); *H04L 9/3073* (2013.01); *H04L 9/3247* (2013.01); *H04L 63/0823* (2013.01); *H04W 76/14* (2018.02); *H04W 80/045* (2013.01); *H04W 88/182* (2013.01)

(56) References Cited

U.S. PATENT DOCUMENTS

| | | | |
|---|---|---|---|
| 2008/0268815 A1 | 10/2008 | Jazra et al. | |
| 2010/0085978 A1 | 4/2010 | Ramankutty et al. | |
| 2011/0191467 A1 | 8/2011 | Imbimbo et al. | |
| 2011/0211553 A1* | 9/2011 | Haddad | H04L 29/12358 370/328 |
| 2011/0249609 A1* | 10/2011 | Brusilovsky | H04W 12/80 370/315 |
| 2011/0314287 A1 | 12/2011 | Escott et al. | |
| 2011/0314522 A1 | 12/2011 | Palanigounder et al. | |
| 2012/0082095 A1* | 4/2012 | Sun | H04W 72/0413 370/328 |
| 2012/0113282 A1 | 5/2012 | Tanaka | |
| 2013/0155948 A1* | 6/2013 | Pinheiro | H04W 76/10 370/328 |
| 2013/0294327 A1* | 11/2013 | Horn | H04W 88/04 370/315 |
| 2014/0003357 A1* | 1/2014 | Ejzak | H04W 76/11 370/329 |
| 2014/0075509 A1* | 3/2014 | Holtmanns | H04W 12/0431 726/3 |
| 2015/0043353 A1 | 2/2015 | Javed | |
| 2015/0058938 A1* | 2/2015 | Gaspar | H04L 63/0892 726/5 |
| 2015/0282026 A1* | 10/2015 | Gupta | H04W 48/16 370/331 |
| 2015/0319595 A1* | 11/2015 | Hakola | H04W 76/14 370/254 |
| 2016/0014686 A1* | 1/2016 | Cho | H04W 48/18 370/328 |
| 2016/0156404 A1 | 6/2016 | Wolfner et al. | |

OTHER PUBLICATIONS

Indian Examination Report dated Feb. 25, 2020 in connection with Indian Patent Application No. 201647034055.
3GPP TS 23.303 v12.0.0; "3rd Generation Partnership Project; Technical Specification Group Services and System Aspects; Proximity-based services (ProSe); Stage 2 (Release 12)", Mar. 10, 2014.
3GPP TR 33.833 v0.4.0; "3rd Generation Partnership Project; Technical Specification Group Services and System Aspects; Study on security issues to support Proximity Services; (Release 12)", Feb. 24, 2014.
M. Groves, "Elliptic Curve-Based Certificateless Signatures for Identity-Based Encryption (ECCSI)," Internet Engineering Task Force (IETF), Request for Comments 6507, Feb. 2012.
3GPP TS 24.301 v8.1.0; "3rd Generation Partnership Project; Technical Specification Group Core Network and Terminals; Non-Access-Stratus (NAS) protocol for Evolved Packet System (EPS); Stage 3 (Release 8)", Mar. 20, 2009.
M. Groves, "Mikey-Sakke: Sakai-Kasahara Key Encryption in Multimedia Internet KEYing (MIKEY)," Internet Engineering Task Force (IETF), Request for Comments 6509, Feb. 2012.
"Identity Solution for Prose one-to-one communications." Agenda Item: 7.13, 7.14. Source: CESG. 3GPP TSG SA WG3 (Security) Meeting #73, Nov. 11-15, 2013; San Francisco (US); 83-131011. 5 pages.
European Examination Report dated Jan. 29, 2020 in connection with EP Patent Application No. 15788630.0.
International Search Report and Written Opinion received in corresponding PCT Application PCT/US2015/029450 dated Aug. 3, 2015.
Non-Final Office Action dated Oct. 6, 2016 for U.S. Appl. No. 14/671,728.
Final Office Action dated May 10, 2017 for U.S. Appl. No. 14/671,728.
Non-Final Office Action dated Oct. 26, 2017 for U.S. Appl. No. 14/671,728.
Final Office Action dated Jun. 28, 2018 for U.S. Appl. No. 14/671,728.
Non-Final Office Action dated Jan. 28, 2019 for U.S. Appl. No. 14/671,728.
Notice of Allowance dated Apr. 22, 2020 for U.S. Appl. No. 14/671,728.
Final Office Action dated Oct. 4, 2019 for U.S. Appl. No. 14/671,728.
International Preliminary Report on Patentability dated Nov. 17, 2016 for PCT/US2015/029450.
"Jack of All I.T." Turn a $60-$120 router into an Enterprise class wireless router with OpenWRT. Sep. 21, 2016.

* cited by examiner

LAWFUL INTERCEPT REPORTING IN WIRELESS NETWORKS USING PUBLIC SAFETY RELAYS

RELATED APPLICATIONS

This application is a continuation of U.S. application Ser. No. 14/671,728 filed on Mar. 27, 2015, which to U.S. Provisional Patent Application No. 61/990,608, which was filed on May 8, 2014, and which is hereby incorporated by reference in its entirety.

BACKGROUND

Wireless networks provide network connectivity to mobile communication devices, such as smart phones. The network connectivity may be provided through radio interfaces. Typically, the mobile devices connect to the wireless network through an access point that is part of the network infrastructure. For example, a device may connect to a cellular base station or a wireless local area network (WLAN) access point (e.g., a WiFi access point).

Some techniques may allow devices to establish direct communication paths with one another (e.g., without going through a cellular base station or WiFi access point). For example, devices that are located in proximity to one another may discover one another and subsequently establish direct communication paths with one another. In specifications published by the $3^{rd}$ Generation Partnership Project (3GPP), direct communication between wireless devices may be referred to as "proximity services" (ProSe). ProSe communications can have a number of advantages, such as improved spectrum utilization, improved overall throughput and performance, and improved energy consumption. In the context of public safety services, ProSe communications can provide an important fallback public safety network that may function when a cellular network (e.g., a 3GPP cellular network) has failed or is unavailable.

A network, such as a 3GPP-based network, may include Lawful Interception (LI) functionality. Under LI, the network provider may enable Law Enforcement Agencies (LEAs) to intercept content and other related information corresponding to traffic of particular mobile devices. For lawful intercept, the target mobile device(s) may need to be identified.

In ProSe communications, a relay device, such as a mobile device acting as a relay device, may be used to couple another mobile device (such as one that is out of the coverage area of the cellular network) to the cellular network. Implementing lawful intercept in this situation can be problematic, however, as the mobile device that is to be targeted for lawful intercept may not be visible to the cellular network.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

Figure 1:
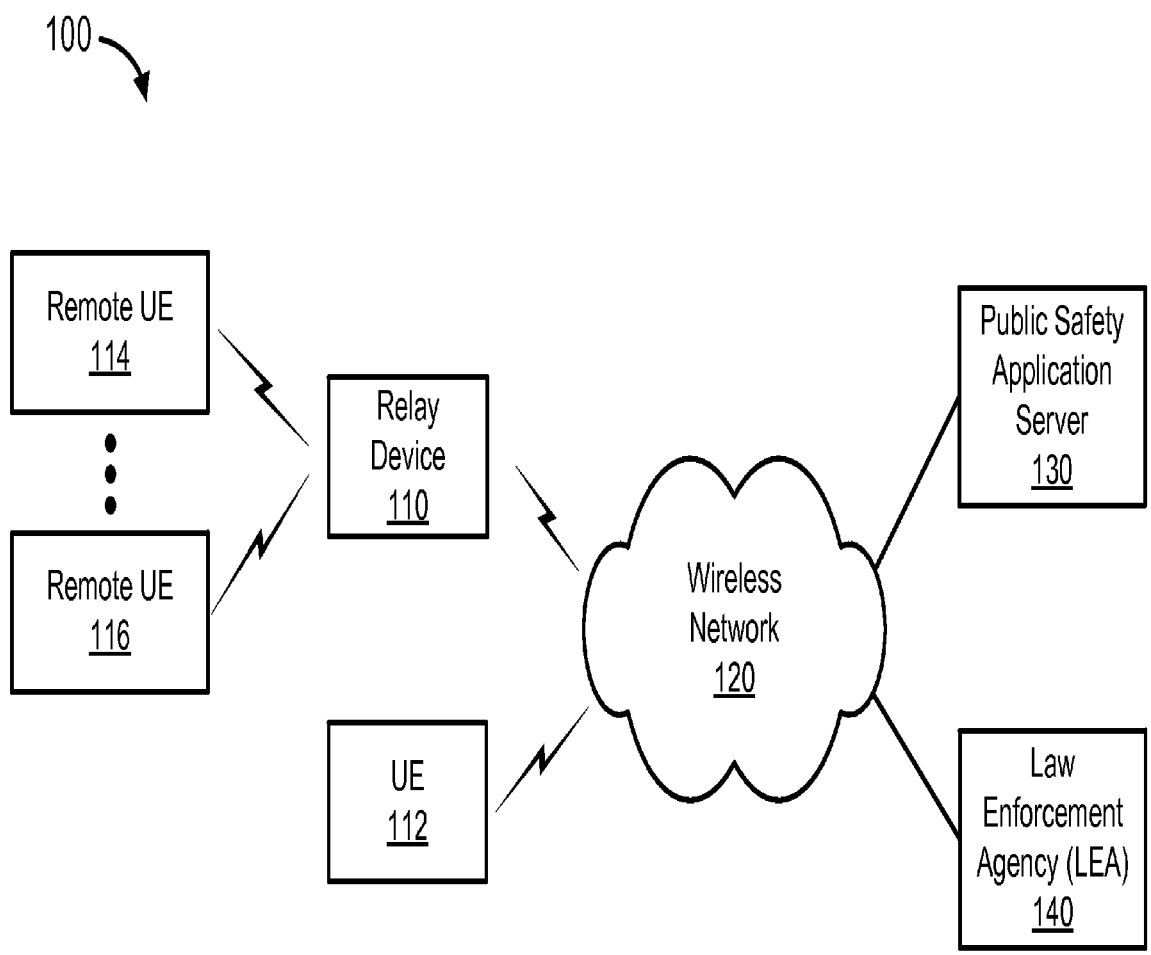
FIG. 1 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may enable Lawful Intercept (LI) services for User Equipment (UE) (e.g., smart phones or other mobile communication devices) in situations in which at least one UE is participating in ProSe services such that the UE is "indirectly" coupled to a cellular network via a relay device. As an example of this situation, a group of public safety personnel (e.g., firefighters) may be first responders at an accident. UEs of one or more members of the group may be out of the coverage range of the cellular network used by the group (e.g., some of the members may be indoors, in a tunnel, etc.). The members of the group may continue to communicate with one another and with the cellular network using ProSe communications services. In this scenario, the UE of one member of the group, which may be within the coverage range of the cellular network, may act as a relay device for other members of the group, which may be referred to as "remote UEs" herein, that are out of the coverage range. All members of the group may thus continue to communicate via the cellular network.

In some situations, such as in the case of Internet Protocol (IP) version 4 addressing (IPv4), the UE acting as the relay device may use Network Address Translation (NAT) techniques when relaying traffic. NAT may obscure visibility, from the standpoint of the cellular network, about which traffic flows correspond to the relay UE and which traffic flows correspond to the remote UEs. This can be problematic for the performance of lawful intercept services.

Consistent with aspects described herein, the relay device may assist in enabling lawful intercept by reporting, to a LI device associated with the cellular network, authenticated identities of the remote UEs and identification information that may allow the LI device to monitor traffic (and/or control statistics related to the traffic) associated with the remote UEs. The authentication of the remote UEs may be performed using a technique that does not require involvement of the cellular network. The identification information may include, for an IPv6 address, an IPv6 prefix. For IPv4 addressing, the identification information may include the public IPv4 address of the relay device and a port number assigned by the relay device. The techniques described herein, for implementing lawful intercept, may generally serve to minimize the impact on existing cellular networks, such as a 3GPP Evolved Packet System (EPS) wireless network.

In one implementation consistent with aspects described herein, a UE may include processing circuitry to: connect with a second UE using a first radio interface that is not connected to a cellular network; connect with the cellular network using a second radio interface; authenticate, via the first radio interface, an identity of the second UE received from the second UE; and act as a wireless relay, to the cellular network, for the second UE to forward communications from the second UE to the wireless network.

Additionally or alternatively, the UE may act as a wireless relay by performing Layer-3 forwarding of IP packets between the second UE and the cellular network. Additionally or alternatively, the first radio interface may include a WLAN direct connection. Additionally or alternatively, the first radio interface may include an E-UTRA direct connection.

Additionally or alternatively, the authentication may be performed based on a digital signature received from the second UE, without requiring, during the authentication of the identity of the second UE, communications over the cellular network. The authentication may be performed using ECCSI techniques or certificate based techniques in which the authentication does not require real-time communication with a common node of trust.

Additionally or alternatively, the UE may report, to a lawful intercept device associated with the cellular network, identification information and the authenticated identity of the second UE. Additionally or alternatively, the identification information nay include an IPv4 address and a port number assigned to the UE as part of a NAT procedure; or an Internet Protocol version 6 (IPv6) address prefix. Additionally or alternatively, the lawful intercept device may include a device operating in the user plane of the wireless network, the processing circuitry may be further to: report the identification information and the authenticated identity of the second UE via a user plane HTTP. The lawful intercept device may include a MME or PGW in a control plane of the wireless network.

In another implementation consistent with aspects described herein, a UE may include a first radio interface; a second radio interface; a computer-readable medium to store processor executable instructions; and processing circuitry to execute the processor executable instructions to: connect, via the first radio interface, with a second UE, in proximity of the UE, to ProSe to the second UE, authenticate an identity of the second UE received, via the first radio interface, from the second UE, relay communications received from the second UE, over the first radio interface, to a wireless network that is connected to the UE via the second radio interface, and report, to a lawful intercept entity associated with the wireless network, identification information that identifies network traffic of the second UE.

Additionally or alternatively, the lawful intercept entity may include a device operating in a user plane of the wireless network, the reporting further including reporting the identification information via a user plane protocol.

In another implementation consistent with aspects described herein, a method, implemented at a relay device, may include authenticating, by the relay device, an identity of a remote UE that is connected to the relay device via a direct radio connection, the authenticating including authenticating an identity of the remote UE; and reporting, by the relay device and to a lawful intercept entity associated with cellular wireless network to which the relay device is connected: an IPv6 address prefix associated with the remote UE, or an IPv4 address and a port number assigned to the remote UE as part of a NAT procedure; and the authenticated identity of the remote UE.

Additionally or alternatively, the method may include relaying traffic, associated with the remote UE, to the cellular wireless network. Additionally or alternatively, the reporting, to the lawful intercept entity, may be performed via Non-Access Stratum (NAS) layer signaling.

In another implementation consistent with aspects described herein, a relay device may include means for authenticating an identity of a remote UE that is connected to the relay device via a direct radio connection, the authenticating including authenticating an identity of the remote UE; and means for reporting, to a lawful intercept entity associated with cellular wireless network to which the relay device is connected: an IPv6 address prefix associated with the remote UE, or an IPv4 address and a port number assigned to the remote UE as part of a NAT procedure; and the authenticated identity of the remote UE.

FIG. 1 is a diagram of an example environment 100 in which systems and/or methods described herein may be implemented. As illustrated, environment 100 may include relay device 110, User Equipment (UE) devices 112, 114, and 116, wireless network 120, public safety application server 130, and law enforcement agency (LEA) 140. UEs 112, 114, and 116 may generally refer to any wireless communication devices, such as a mobile telephone, smart phone, tablet computing device, laptop computing device, etc., that is capable of communicating wirelessly with wireless network 120. Relay device 110 may also be a UE device, such as a UE device that is structurally similar or identical to UEs 112, 114, or 116. For clarity, a UE, when operating to perform functionality of a relay device, will be referred to herein as a "relay device" (i.e., relay device 110). Similarly, remote UEs 114 and 116 may be structurally similar or equivalent to UE 112. A UE that is communicating through relay device 110 to obtain network connectivity will be referred to herein as a "remote UE" (e.g., remote UE 114 or 116).

Relay device 110, UE 112, and remote UEs 114 and 116 may each include a portable computing and communication devices, such as a personal digital assistant (PDA), a smart phone, a cellular phone, a laptop computer with connectivity to a cellular wireless network, a tablet computer, etc. Relay device 110, UE 112, and remote UEs 114 and 116 may also include non-portable computing devices, such as desktop computers, consumer or business appliances, or other devices that have the ability to connect to wireless network 120. Relay device 110, UE 112, and remote UEs 114 and 116 may connect, through a radio link, to wireless network 120.

Relay device 110, UE 112, and remote UEs 114 and 116 may include radio interfaces that allow devices 110-116 to connect wirelessly to wireless network 120, to one another, and/or to other devices. For example, relay device 110, UE 112, and remote UEs 114 and 116 may each include a first radio transceiver to connect to a cellular access network, such as a 3GPP/Long Term Evolution (LTE) based-network, and a second radio transceiver to implement WiFi-based communications (e.g., Institute of Electrical and Electronics Engineers' (IEEE) 802.11-based communications). Relay device 110, UE 112, and remote UEs 114 and 116 may connect directly to one another using ProSe services implemented over a direct communication path (e.g., via a WLAN connection, such as a WiFi direct path, or through an Evolved Universal Terrestrial Radio Access (E-UTRA) direct communication path that does not use wireless network 120). Alternatively or additionally, when within the coverage area of wireless network 120, relay device 110 and UE 112 may communicate with wireless network 120.

Wireless network 120 may include one or more networks that provide wireless network connectivity to mobile devices 110. For example, wireless network 120 may represent a wireless network that provides cellular wireless coverage. In some implementations, wireless network 120 may be associated with a LTE network. One example implementation of wireless network 120 in conjunction with a relay device is illustrated, in additional detail, in FIG. 2.

Public safety application server 130 may include one or more computation and communication devices that provide services to public safety personnel and/or organizations. For example, public safety application server 130 may provide services relating to ProSe communications between public safety personnel, such as services relating to assisting in the identification of UEs in physical proximity with one another and/or the enablement of optimized communications between the UEs. As another example, public safety application server 130 may function to enable group calling between groups of public safety personnel, such as one-to-many calling or the dispatching of public safety personnel to emergency situations. Although shown as being implemented outside of wireless network 120, in practice, public safety application server may alternatively or additionally be implemented within wireless network 120.

LEA 140 may represent an entity, such as a law enforcement entity, that may obtain network communications data pursuant to lawful authority for the purpose of analysis or evidence. The obtained data may include, for example, signaling or network management information or, alternatively or additionally, the substantive content of communications. The signaling/network management information may be referred to as Intercept Related Information (IRI) herein, and the substantive content may be referred to as Content of Communications (CC) herein. In one implementation, LEA 140 may transmit an intercept request to wireless network 120. The intercept request may include authentication information validating that the request is a lawful request and information identifying the parties to which the request is to be applied. In response, wireless network 120 may intercept the indicated communications and provide the intercepted information to LEA 140.

Figure 2:
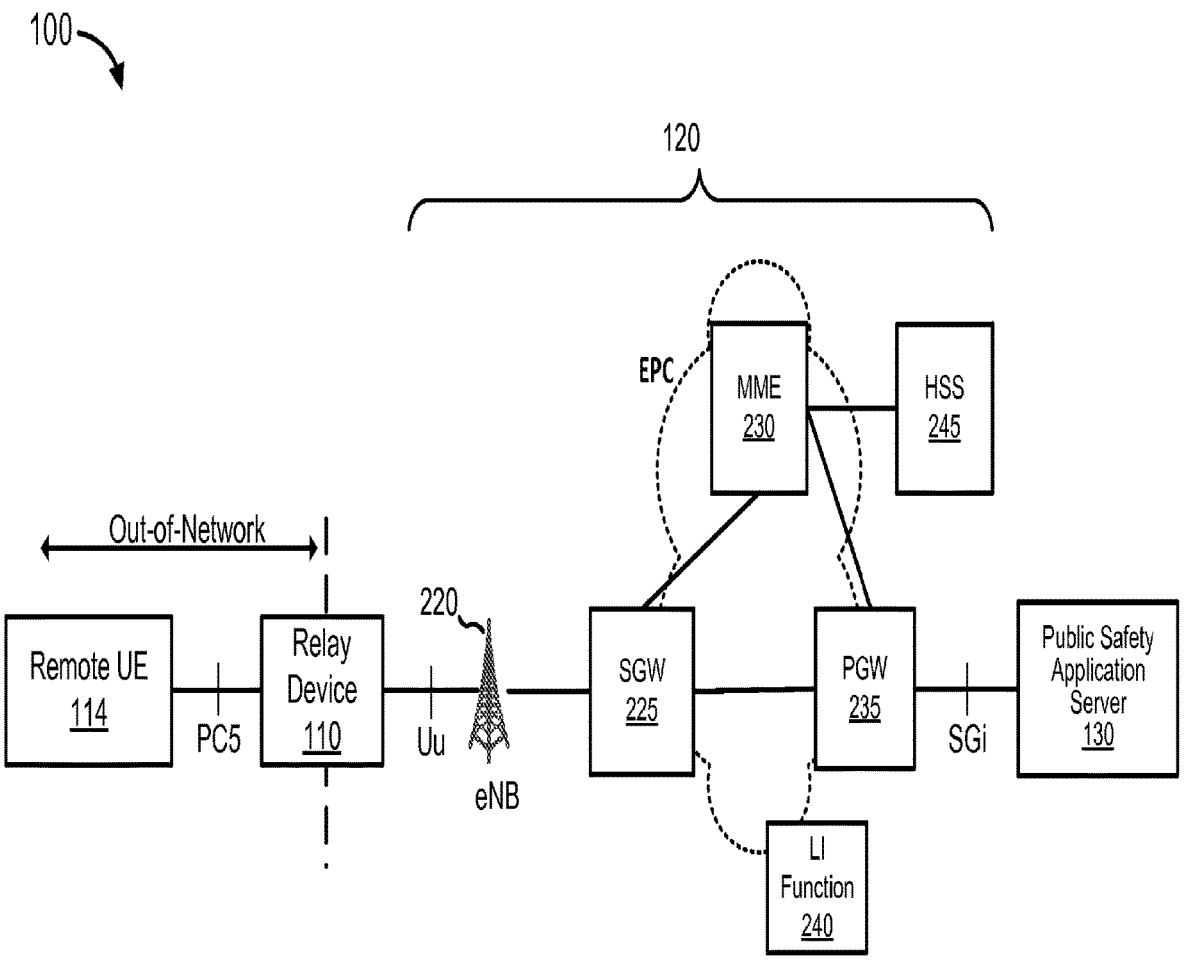
FIG. 2 is a diagram of an example implementation of portions of the environment shown in FIG. 1 in additional detail.

FIG. 2 is a diagram of an example implementation of portions of environment 100 in additional detail. In particular, in FIG. 2, an example implementation of wireless network 120 is illustrated in the context of a relay device and a remote UE communicating using ProSe techniques.

In FIG. 2, wireless network 120 may include an EPS that includes a LTE network and/or an evolved packet core (EPC) network that operates based on a 3GPP wireless communication standard. The LTE network may be, or may include, a radio access network that includes one or more base stations, some or all of which may take the form of an eNodeB (eNB) 220, via which relay device 110 may communicate with the EPC network. The EPC network may include one or more serving gateways (SGWs) 225, mobility management entities (MMEs) 230, and/or packet data network gateways (PGWs) 235, and may enable UEs to communicate with an external network. Additionally, wireless network 120 may include LI function 240 and home subscriber server (HSS) 245.

eNB 220 may include one or more network devices that receive, process, and/or transmit traffic destined for and/or received from relay device 110. eNB 220 may provide the wireless (i.e., radio) interface with relay device 110.

SGW 225 may include one or more network devices that route data of a traffic flow. SGW 225 may aggregate traffic received from one or more base stations 220 and may send the aggregated traffic to an external network via PGW 235. SGW 225 may also act as a mobility anchor during inter-base station handovers.

MME 230 may include one or more computation and communication devices that act as a control-node for eNB 220 and/or other devices that provide the air interface for wireless network 120. For example, MME 230 may perform operations to register relay device 110 with wireless network 120, to establish bearer channels (e.g., traffic flows) associated with a session with relay device 110, to hand off relay device 110 to another network, and/or to perform other operations. MME 230 may perform policing operations on traffic destined for and/or received from relay device 110.

PGW 235 may include one or more network devices that may aggregate traffic received from one or more SGWs 225, and may send the aggregated traffic to an external network PGW 235 may also, or alternatively, receive traffic from the external network and may send the traffic toward relay device 110 via SGW 225, and/or base station 220.

LI function 240 may represent functionality, implemented by one or more network devices, to perform lawful intercept. Based on identification information for a UE, LI function 240 may capture and report IRI and/or CC data relating to the UE. LI function 240 may report the captured data to an authorized entity, such as LEA 140. LI function 240 may be implemented as functionality that is part of, for example, MME 230, PGW 235, HSS 245, public safety application server 130, or as part of another network element. Alternatively or additionally, LI function 240 may be implemented by a dedicated network device.

HSS 245 may include one or more devices that may manage, update, and/or store, in a memory associated with HSS 245, profile information associated with a subscriber. The profile information may identify applications and/or services that are permitted for and/or accessible by the subscriber; a mobile directory number (MDN) associated with the subscriber; bandwidth or data rate thresholds associated with the applications and/or services; and/or other information. The subscriber may be associated with UEs 110-116. Additionally, or alternatively, HSS 245 may perform authentication, authorization, and/or accounting operations associated with the subscriber and/or a communication session with UEs 110-116.

A number of communication interfaces, which may include standardized 3GPP interfaces, are illustrated in FIG. 2. For example, remote UE 114, which may be out of network with respect to connectivity to wireless network 120, may directly communicate with relay device 110 (e.g., using an E-UTRA direct connection) using the PC5 interface. The PC5 interface may generally be used for UE to UE (e.g., remote UE to relay device) control and user plane communications. Relay device 110 may communicate with eNB 220 using the LTE-Uu interface. Relay device 110 may perform a mapping between bearers over the PC5 and Uu interfaces. Additionally, remote UE 114 may not maintain a signaling connection to wireless network 120. Instead, relay device 110 may be responsible for the establishment and maintenance of the EPS bearers associated with wireless network 120.

In operation, relay device 110 may operate as a Layer-3 device (e.g., relay device 110 may behave as a router that performs Layer-3 forwarding of IP packets) with respect to performing relay functions for remote UE 114. When IPv6 addressing is used on the PC5 interface, relay device 110 may perform prefix delegation to assign an IPv6 prefix to remote UE 114. The assigned IPv6 prefix may subsequently be used by wireless network 120 to identify communications associated with remote UE 114. IPv6 prefix delegation is described in, for example, in the 3GPP technical specification (TS) 23.303 v.12.0.0.

In some implementations, the PC5 interface may use IPv4 addressing. In this situation, relay device 110 may act as a NAT device and may assign UE 114 a private IPv4 address. When communicating with wireless network 120, relay device 110 may assign a particular port value to relay device 110, and may use the public IPv4 address of relay device 110 (i.e., the IPv4 address seen by wireless network 120), in combination with the particular port value, to handle network traffic associated with remote UE 114.

As will be described in more detail below, to enable lawful intercept of traffic associated with remote UE 114, relay device 110 may authenticate remote UE 114 using an authentication technique that does not require real-time signaling over wireless network 120. In other words, relay device 110 may authenticate the identity of remote UE 114 using out-of-network communications (i.e., over the PC5 interface) between remote UE 114 and relay device 110. Relay device 110 may then report the authenticated identity of remote UE 114 along with the assigned IPv6 prefix (for IPv6 communications) or the public IPv4 address and port value (for IPv4 communications) to wireless network 120 (e.g., to LI function 240). LI function 240 may subsequently perform lawful intercept of communications associated with remote UE 114, such as by reporting CC or IRI information relating to the communications. The operations performed by relay device 110 may generally operate in a manner that minimizes the impact on existing 3GPP systems.

Figure 3:
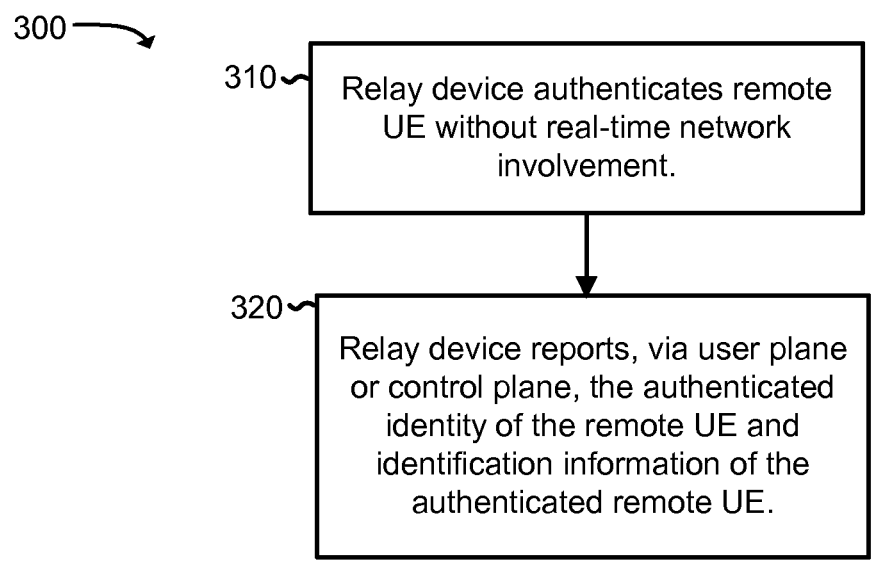
FIG. 3 is flow chart illustrating an example process for performing lawful intercept reporting.

FIG. 3 is flow chart illustrating, at a high level, an example process 300 for performing lawful intercept reporting. Process 300 may be implemented, for example, by relay device 110.

Process 300 may include authentication, by relay device 110, of a remote UE (block 310). The authentication may be performed without real-time involvement of wireless network 120. For example, the authentication may be performed between relay device 110 and remote UE 114 via the PC5 interface. In some implementations, relay device 110 and remote UE 114 may have been previously provisioned (potentially using wireless network 120) to support the authentication. Various techniques to implement the authentication will be described in more detail below.

Process 300 may further include reporting, via the user plane or control plane of the wireless network (i.e., wireless network 120), the authenticated public identity of the remote UE and identification information for the authenticated remote UE (block 320). For example, relay device 110 may, either in response to an explicit request from LI function 240 (or from another network element) or at another time (e.g., based on successful authentication of a remote UE), transmit the identification information for remote UE 114 to wireless network 120. Relay device 110 may also transmit the authenticated identity of remote UE 114 (e.g., a digital signature received from UE 114 as part of the authentication process). The identification information may be transmitted to LI function 240 or to another network element to enable lawful intercept reporting to be performed by wireless network 120. The identification information may include information needed by wireless network 120 to identify traffic corresponding to remote UE 114. As mentioned previously, in the case of IPv6 traffic, the identification information may include the IPv6 prefix assigned to remote UE 214. In the case of IPv4 traffic, the identification information may include the IPv4 public address of relay device 110 and the port number assigned to remote UE 114 by relay device 110.

Relay device 110, when reporting the identification information via the user plane, may perform the reporting using an appropriate protocol, such as hypertext transfer protocol (HTTP). Reporting via the user plane may be performed when LI function 240 is reachable via user plane traffic, such as when LI function is implemented as part of a ProSe service implemented by public safety application server 130. In other situations, such as when LI function 240 is implemented within MME 230, control plane signaling, such as Non-Access Stratum (NAS) layer signaling, may be used to provide the identification information to LI function 240 (e.g., to MME 230).

Figure 4:
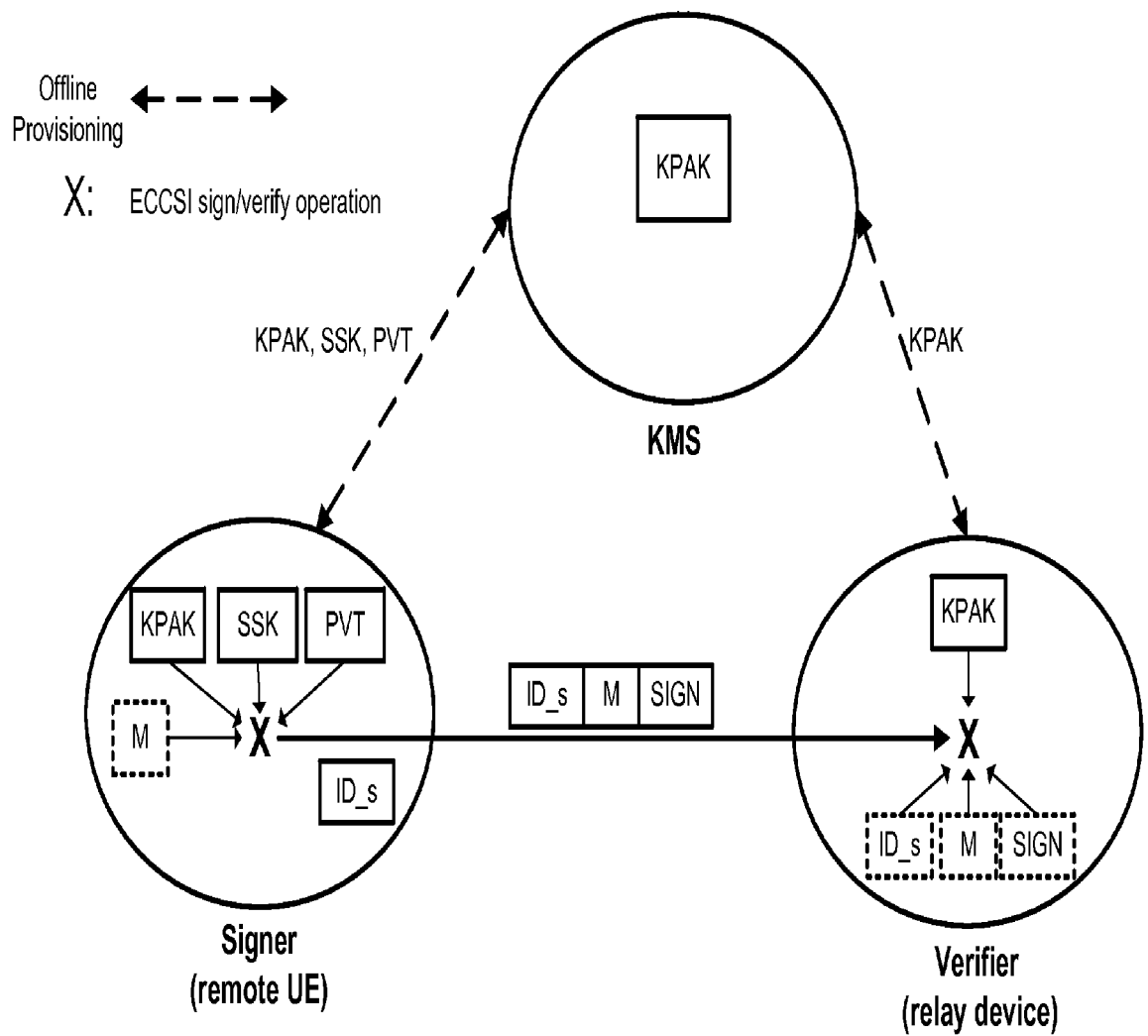
FIG. 4 is a diagram illustrating a technique that may be used to authenticate a remote User Equipment (UE) without network involvement.

FIG. 4 is a diagram illustrating one possible technique that may be used to authenticate a remote UE without network involvement. In FIG. 4, the Elliptic Curve-Based Certificateless Signatures for Identity-Based Encryption (ECCSI) technique is illustrated. ECCSI is a known technique that is described in more detail in Internet Engineering Task Force (IETF) Request For Comments (RFC) 6507.

In FIG. 4, a Key Management Service (KMS), Signer, and Verifier are illustrated. In the context of FIGS. 1 and 2, the Signer may correspond to remote UE 114 and the Verifier may correspond to relay device 110. The KMS may correspond to a trusted authentication service, such as one implemented by a device associated with wireless network 120 or a device associated with an external network. For ECCSI authentication, the Signer and Verifier, at some point, may need to be provisioned with data received from the KMS. The provisioning may be performed, however, at some point prior to the performance of the ECCSI authentication (e.g., when the Signer and Verifier are within the coverage range of wireless network 120).

As illustrated in FIG. 4, the KMS may maintain a KMS Public Authentication Key (KPAK) that may be known by all users. The KPAK may be stored by the Signer and Verifier. Additionally, as part of the initial provisioning, the Signer may obtain a Secret Signing Key (SSK) and Public Validation Token (PVT) from the KMS. Further, every user may be associated with a publicly known identity. In FIG. 4, the publicly known identity of the Signer is illustrated as ID_s.

For an authentication operation, the Signer may combine the KPAK, the SSK, the PVT, and the message (M) that is to be signed, in the manner specified in RFC 6507 (i.e., in the manner consistent with the ECCSI technique). The resultant signature (SIGN) may be transmitted, over the PC5 interface, with the message (M) and the public identity of the Signer (ID_s), to the Verifier. Upon reception, the Verifier may apply the ECCSI technique, based on the KPAK, the received message (M), the public identity of the Signer (ID_s), and the signature (SIGN), to authenticate the Signer. With ECCSI, a single communication from the Signer to the Verifier may be used to authenticate the Signer.

As an alternative to using ECCSI-based authentication, other authentication techniques may be used authenticate the remote UE without real-time network involvement. For example, digital certificate-based techniques may be used. For example, a certificate, such as a certificate corresponding to the ITU-T (ITU Telecommunication Standardization Sector) X.509 standard, and issued by a trusted certificate authority, may be stored/provisioned at relay device 110 and/or remote UE 114. Authentication may be based on an exchange of the certificates. In either the ECCSI-based authentication or the certificate-based authentication, authentication may be performed without real-time communication with a common note of trust (i.e., without real-time adjudication with KMS or a trusted certificate server).

Figure 5:
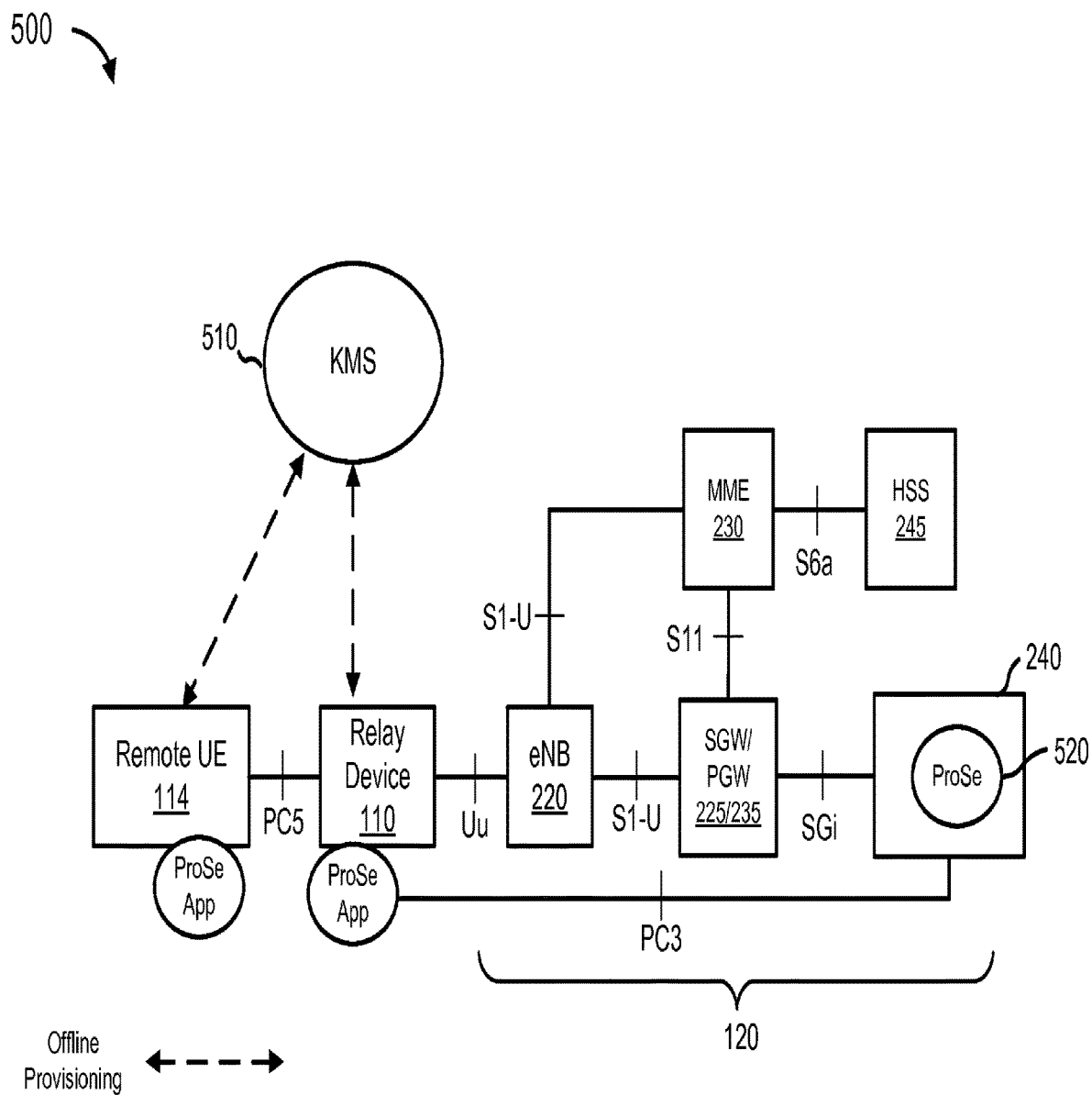
FIG. 5 is a diagram illustrating an example implementation of a system for performing lawful intercept reporting of identification information for a remote UE.

FIG. 5 is a diagram illustrating an example implementation of a system 500 for performing lawful intercept reporting of identification information for a remote UE. In this example, ECCSI-based authentication is used. The system of FIG. 5 is similar to that shown in FIG. 2. Additionally, as shown, system 500 may include key management server (KMS) 510, which may implement an ECCSI key management device. Additionally, in system 500, LI function 240 is illustrated as being performed by ProSe component 520 of public application server 130. ProSe component 520 may implement functionality related to the enablement of ProSe services for UEs used by public safety personnel. ProSe communications between relay device 110 and remote UE 114 may be performed using ProSe applications (ProSe App) that are implemented by relay device 110 and remote UE 114.

A number of communication interfaces, between the various components of system 500, are illustrated in FIG. 5. The communication interfaces may include 3GPP standardized interfaces. As illustrated, the interfaces may include: a PC5 interface between relay device 110 and remote UE 114, a PC3 interface between relay device 110 and ProSe component 520, a Uu interface between relay device 110 and eNB 220, a S1-U interface between eNB 220 and SGW/PGW 225/235, a S1-U interface between eNB 220 and MME 230, a SGi interface between SGW/PGW 225/235 and ProSe component 520, a S11 interface between SGW/PGW 225/235 and MME 230, and a S6a interface between MME 230 and HSS 245.

Figure 6:
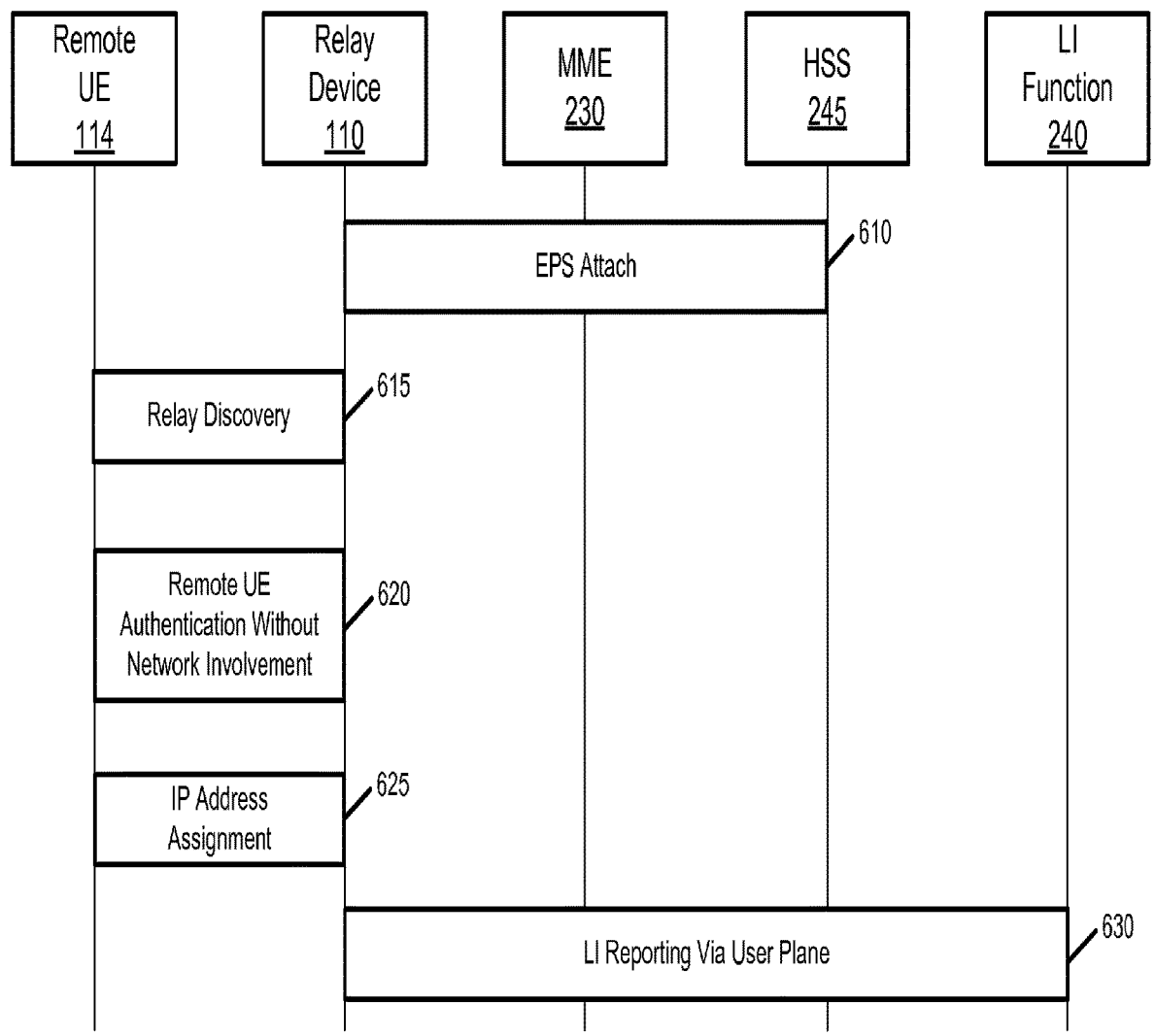
FIGS. 6 and 7 are diagrams illustrating examples of communication flows for performing lawful intercept reporting of identification information for a remote UE.

FIG. 6 is a diagram illustrating an example of a communication flow 600, which may be performed in system 500, for performing lawful intercept reporting of identification information for a remote UE in system 500. For communication flow 600, the lawful intercept reporting may be performed via the user plane of wireless network 120. The operations of communication flow 600 will be discussed with reference to FIG. 5.

Relay device 110, which may be within the coverage range of wireless network 120, may initially attach to wireless network 120 (at 610, "EPS Attach"). Attaching to wireless network 120 may be performed using existing techniques. At some point, remote UE 114 and relay device 110 may discover one another for the purpose of ProSe communications (at 615, "Relay Discovery"). For example, using ProSe Direct Discovery, as defined in 3GPP TS 23.303, v12.0.0, a UE may detect and identify another UE in proximity using E-UTRA direct radio signals.

Remote UE 114 may be authenticated by relay device 110 (at 620, "Remote UE Authentication Without Network Involvement"). As previously mentioned, the authentication may be made without the involvement of wireless network 120 (e.g., based only on communications over the PC5 interface between relay device 110 and remote UE 114). For example, in one implementation, authentication may be performed using ECCSI-based authentication techniques. In this situation, and with reference to FIG. 4, remote UE 114 and relay device 110 may act in the role of Signer and Verifier, respectively. Alternatively, as another example, authentication may be performed using certificate-based authentication techniques. In either situation, provisioning may be performed at an earlier time such as during initial provisioning of the UEs or when the UEs are attached to wireless network 120.

Authentication that does not require network involvement may have the benefit of not having to support the RADIUS or Diameter protocol in relay device 110. This can be advantageous as a public safety UE may be expected to occasionally operate as relay device 110.

Relay device 110 may assign an IP address to remote UE 114 (at 625, "IP Address Assignment"). When IPv6 addressing is being used, relay device 110 may assign an IPv6 prefix to remote UE 114 using IP prefix delegation (e.g., as described in 3GPP TS 23.303 v12.0.0). Alternatively, when IPv4 addressing is used, relay device 110 may assign a private IPv4 address to remote UE 114. When relaying communications to network 120, relay device 110 may translate the private IPv4 address to the public IPv4 address of relay device 110 along with a port number assigned, by relay device 110, to remote UE 114.

At some point, relay device 110 may report, via the user plane, the identification information of remote UE 114 (at 630, "LI Reporting via User Plane"). In this implementation, the network device, corresponding to the device performing the lawful intercept function (i.e., LI function 240), is reachable via user plane traffic. For example, the network device associated with LI function 240 may correspond to public safety application server 130 that implements ProSe component 520, or another network device reachable via the user plane of wireless network 120. An appropriate user plane protocol, such as HTTP, may be used to report the identification information. In the example of FIG. 5, for instance, the PC3 interface, such as via HTTP over the PC3 interface, may be used to report the identification information to LI function 240. In some implementations, the authenticated public identify of the remote UE 114 (e.g., ID_s in the description of FIG. 4) may also be reported.

As previously mentioned, the identification information may include information needed by wireless network 120 to identify traffic corresponding to remote UE 114. In the case of IPv6 traffic, the identification information may include the IPv6 prefix assigned to remote UE 214. In the case of IPv4 traffic, the identification information may include IPv4 public address of relay device 110 and the port number assigned to remote UE 114 by relay device 110.

In response to receiving the identification information, or at some later time, the device performing the lawful intercept function may obtain and/or analyze communications from remote UE 114, such as, for user plane traffic, the content of the communications. The content of the communications may be transmitted to law enforcement agency 140.

Figure 7:
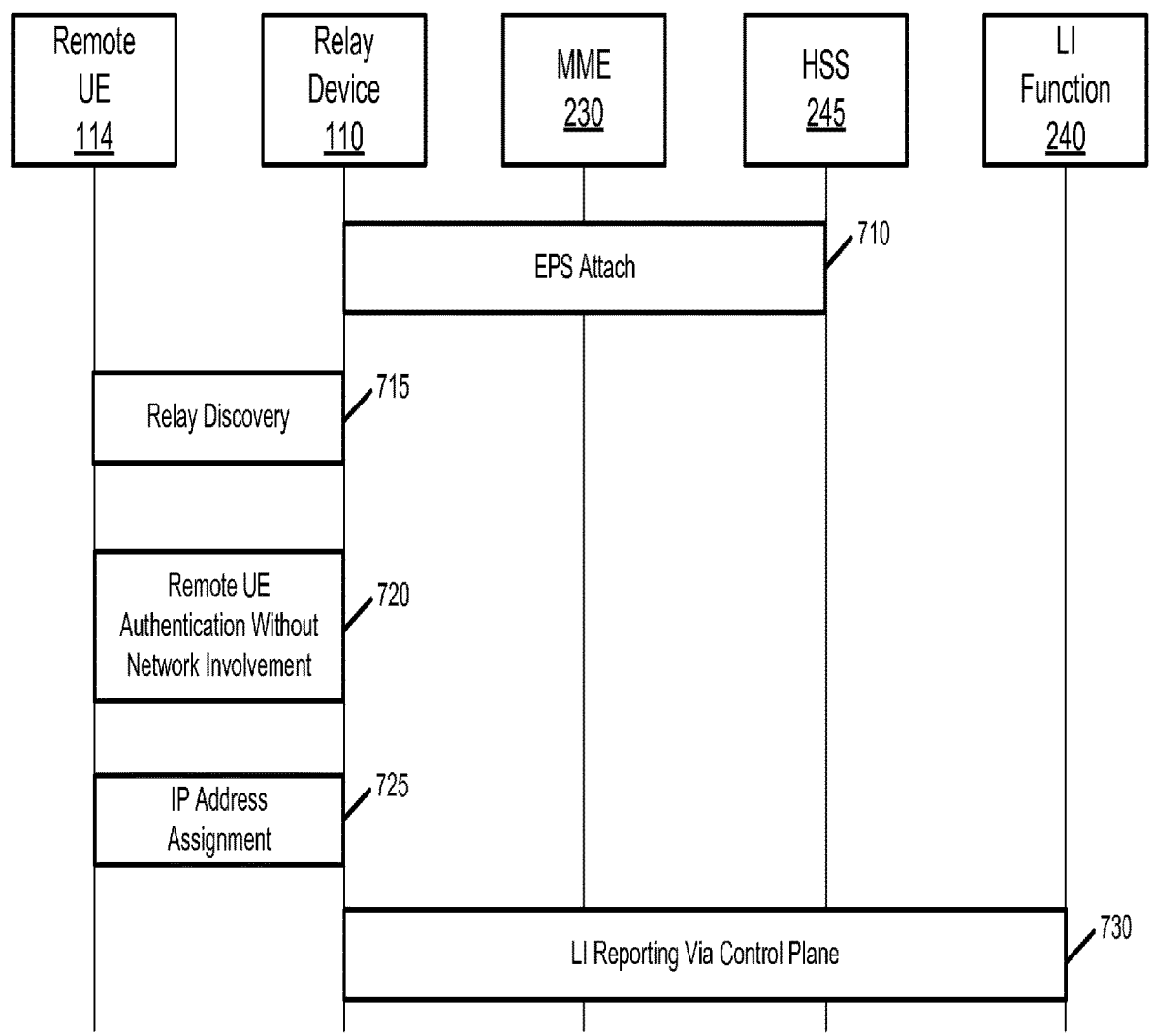

FIG. 7 is a diagram illustrating another example of a communication flow 700, which may be performed in system 500, for performing lawful intercept reporting of identification information for a remote UE in system 500. For communication flow 700, the lawful intercept reporting may be performed via the control plane of wireless network 120.

A number of the communications shown in FIG. 7 are similar to the corresponding communications shown in FIG. 6. In particular, communications 710-725 correspond to communications 610-625, respectively. For brevity, the descriptions of these communications will not be repeated herein.

At some point, relay device 110 may report, via the control plane, the identification information of remote UE 114 (at 730, "LI Reporting via Control Plane"). In this implementation, the network device, corresponding to the device performing the lawful intercept function (i.e., LI function 240), is reachable via user control traffic. For example, the network device may correspond to MME 230 or PGW 235, or another network device reachable via the control plane of wireless network 120. The reporting may be performed via NAS signaling.

In one implementation, the NAS notification procedure, as defined in 3GPP TS 24.301, may be used. In some 3GPP network implementations, however, the NAS notification procedure may only be implemented by the network (and not by relay device 110). In these situations, lawful intercept reporting via the control plane may be performed by one or more of: (1) a modified NAS notification procedure in which initiation by a UE is permissible; or (2) overloading of an existing UE-initiated NAS procedure, such as a modification to the NAS UE Requested Bearer Resource Modification. Alternatively or additionally, a new NAS procedure, specific to lawful intercept reporting, may be defined.

In some network implementations, LI function 240 may be implemented in PGW 235. In this implementation, lawful intercept reporting may be performed either indirectly by causing the MME 230 to forward the lawful intercept reporting, or directly using the Protocol Configuration Options (PCO) parameter that is sent by remote device 110 (e.g., by using the NAS Requested Bearer Resource Modification procedure). The PCO is a component of a number of NAS messages, such as a PDN Connectivity Request, an Activate Default EPS Bearer Context Request, and an "Activate Default EPS Bearer Context Accept message.

In both communications 630 and 730, the reported information, associated with remote UE 114, may be encoded in a number of formats, such as a format compatible with the guidelines specified in RFC 6509. As an example, the identification information and/or the authenticated public identity may be a concatenation of a fixed part and a varying part. The fixed part may be in the form of, for example, an International Mobile Subscriber Identity (IMSI), a Session Initiation Protocol (SIP) Uniform Resource Identifier (URI), a terminal equipment list (TEL) URI, and/or other user@domain types of URI. The varying part may include, for example, a timestamp value.

Figure 8:
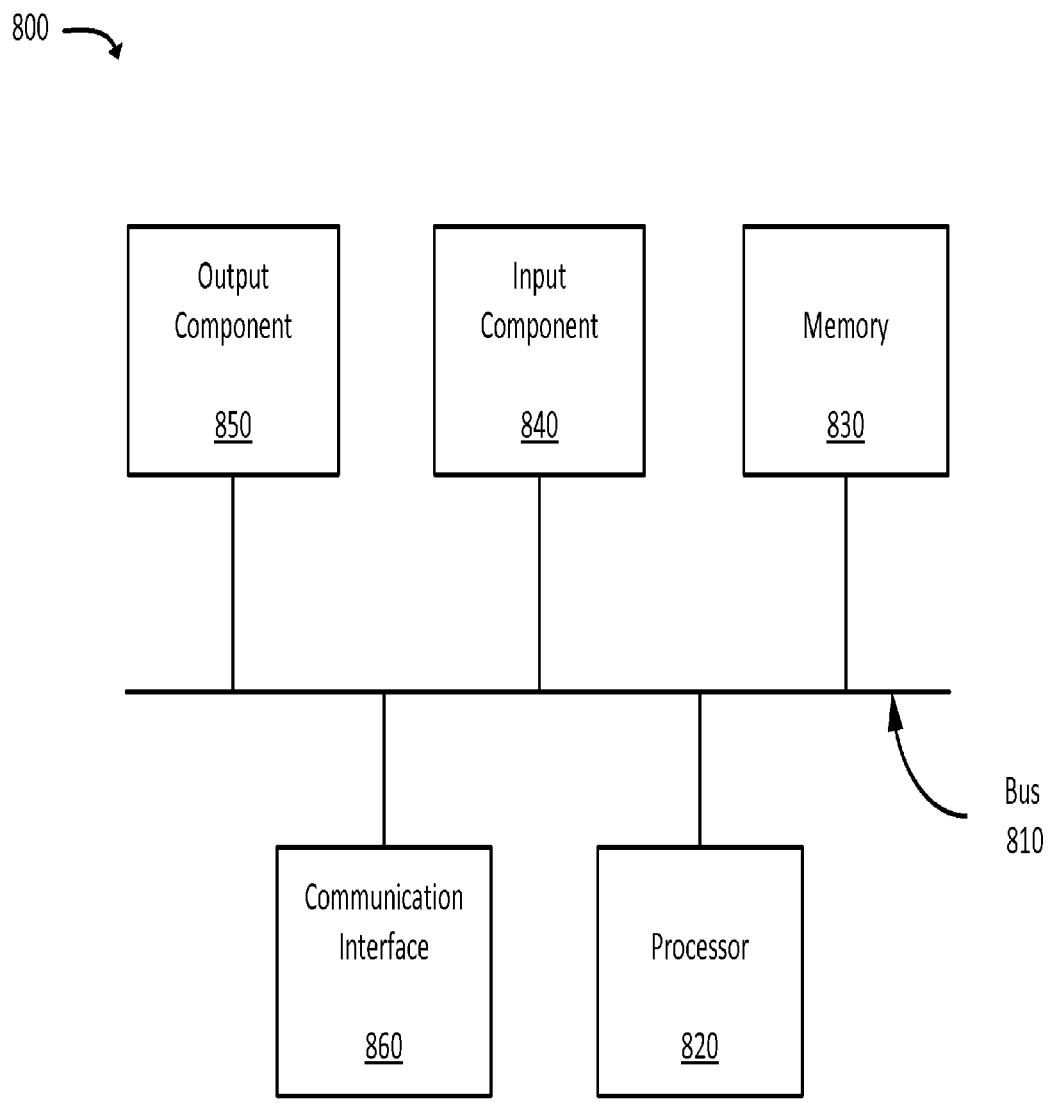
FIG. 8 is a diagram of example components of a device.

FIG. 8 is a diagram of example components of a device 800. Each of the devices illustrated in FIGS. 1, 2, 4, and/or 5 and may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIG. 3, the order of the blocks may be modified in other implementations. Further, non-dependent blocks may be performed in parallel. Similarly, while a series of communications have been described with regard to FIGS. 6 and 7, the order of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method for a relay device, comprising:
   authenticating a remote User Equipment (UE) that is connected to the relay device via a direct radio connection; and
   based on Internet Protocol version 6 (IPv6) addressing being used for the direct radio connection,
   assigning an IPv6 address prefix to the remote UE using IP prefix delegation, and
   reporting, to a mobility management entity (MME) associated with a cellular wireless network to which the relay device is connected, the IPv6 address prefix and information related to an authenticated identity of the remote UE, and
   based on Internet Protocol version 4 (IPv4) addressing being used for the direct radio connection,
   assigning a first IPv4 address to the remote UE, and
   reporting a second IPv4 address to the MME, the second IPv4 address determined based on the first IPv4 address using a Network Address Translation (NAT) procedure and the information related to the authenticated identity of the remote UE.

2. The method of claim 1, further comprising relaying traffic associated with the remote UE, to the cellular wireless network, using Layer-3 forwarding of Internet Protocol (IP) packets between the remote UE and the cellular wireless network.

3. The method of claim 1, wherein the authentication of the remote UE is performed based on digital signature received from a second UE, without communicating with a key management server.

4. The method of claim 3, wherein the authentication is performed using Elliptic Curve-Based Certificateless Signatures for Identity-Based Encryption (ECCSI) techniques or certificate based techniques.

5. The method of claim 1, wherein the MME is configured to communicate with a lawful intercept entity that includes a device operating in a user plane of the cellular wireless network, the reporting further including:
   reporting the IPv6 address prefix or the IPv4 address and a port number, and the authenticated identity of the remote UE, via a user plane protocol.

6. The method of claim 1, wherein the reporting to the MME is performed via Non-Access Stratum (NAS) layer signaling.

7. The method of claim 1, comprising authenticating the remote UE based on information previously received by the relay device and the remote UE from the cellular wireless network.

8. The method of claim 1, comprising authenticating the remote UE using out of network communications.

9. A baseband processor for a relay device, comprising:
   authenticating a remote User Equipment (UE) that is connected to the relay device via a direct radio connection; and
   based on Internet Protocol version 6 (IPv6) addressing being used for the direct radio connection,
   assigning an IPv6 address prefix to the remote UE using IP prefix delegation, and
   reporting, to a mobility management entity (MME) associated with a cellular wireless network to which the relay device is connected, the IPv6 address prefix and information related to an authenticated identity of the remote UE, and
   based on Internet Protocol version 4 (IPv4) addressing being used for the direct radio connection,
   assigning a first IPv4 address to the remote UE, and
   reporting a second IPv4 address to the MME, the second IPv4 address determined based on the first IPv4 address using a Network Address Translation (NAT) procedure and the information related to the authenticated identity of the remote UE.

10. The baseband processor of claim 9, further comprising relaying traffic associated with the remote UE, to the cellular wireless network, using Layer-3 forwarding of Internet Protocol (IP) packets between the remote UE and the cellular wireless network.

11. The baseband processor of claim 9, wherein the authentication of the remote UE is performed based on digital signature received from a second UE, without communicating with a key management server.

12. The baseband processor of claim 11, wherein the authentication is performed using Elliptic Curve-Based Certificateless Signatures for Identity-Based Encryption (ECCSI) techniques or certificate based techniques.

13. The baseband processor of claim 9, wherein the MME is configured to communicate with a lawful intercept entity that includes a device operating in a user plane of the cellular wireless network, the reporting further including:
    reporting the IPv6 address prefix or the IPv4 address and a port number, and the authenticated identity of the remote UE, via a user plane protocol.

14. The baseband processor of claim 9, wherein the reporting to the MME is performed via Non-Access Stratum (NAS) layer signaling.

15. The baseband processor of claim 9 further configured to perform operations comprising authenticating the remote UE based on information previously received by the relay device and the remote UE from the cellular wireless network.

16. The baseband processor of claim 9 further configured to perform operations comprising authenticating the remote UE using out of network communications.

17. A User Equipment (UE) comprising a processor configured to perform operations comprising:
    authenticating a remote User Equipment (UE) that is connected to the UE via a direct radio connection; and
    based on Internet Protocol version 6 (IPv6) addressing being used for the direct radio connection,
    assigning an IPv6 address prefix to the remote UE using IP prefix delegation, and
    reporting, to a mobility management entity (MME) associated with a cellular wireless network to which the relay device is connected, the IPv6 address prefix and information related to an authenticated identity of the remote UE, and
    based on Internet Protocol version 4 (IPv4) addressing being used for the direct radio connection,
    assigning a first IPv4 address to the remote UE, and
    reporting a second IPv4 address to the MME, the second IPv4 address determined based on the first IPv4 address using a Network Address Translation (NAT) procedure and the information related to the authenticated identity of the remote UE.

18. The UE of claim 17, further comprising relaying traffic associated with the remote UE, to the cellular wireless network, using Layer-3 forwarding of Internet Protocol (IP) packets between the remote UE and the cellular wireless network.

19. The UE of claim 17, wherein the authentication of the remote UE is performed based on digital signature received from a second UE, without communicating with a key management server.

20. The UE of claim 19, wherein the authentication is performed using Elliptic Curve-Based Certificateless Signatures for Identity-Based Encryption (ECCSI) techniques or certificate based techniques.

21. The UE of claim 17, wherein the MME is configured to communicate with a lawful intercept entity that includes a device operating in a user plane of the cellular wireless network, the reporting further including:
   reporting the IPv6 address prefix or the IPv4 address and a port number, and the authenticated identity of the remote UE, via a user plane protocol.

22. The UE of claim 17, wherein the reporting to the MME is performed via Non-Access Stratum (NAS) layer signaling.

23. The UE of claim 17, wherein the processor is further configured to perform operations comprising authenticating the remote UE based on information previously received by the UE and the remote UE from the cellular wireless network.

24. The UE of claim 17, wherein the processor is further configured to perform operations comprising authenticating the remote UE using out of network communications.

* * * * *